Sept. 30, 1930.  R. ZERBONE  1,777,242
DEVICE FOR FASTENING VEHICLE WHEELS
Filed March 2, 1929  2 Sheets-Sheet 1

Sept. 30, 1930.     R. ZERBONE     1,777,242
DEVICE FOR FASTENING VEHICLE WHEELS
Filed March 2, 1929     2 Sheets-Sheet 2
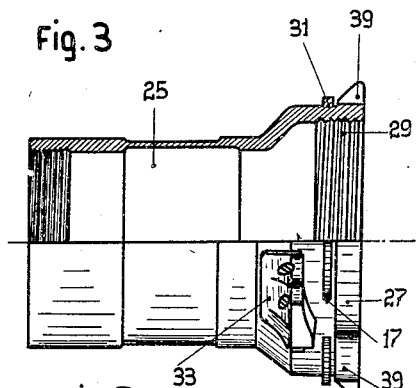
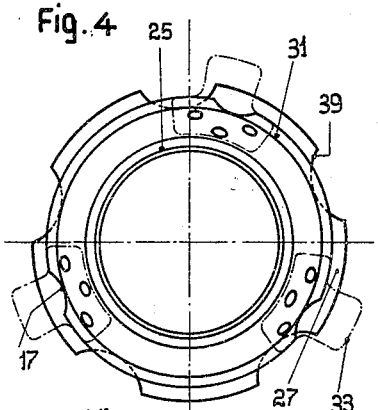
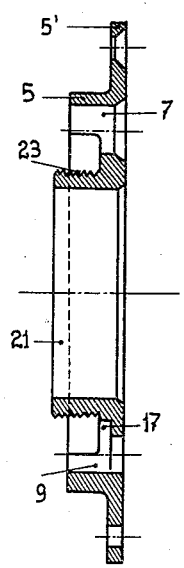
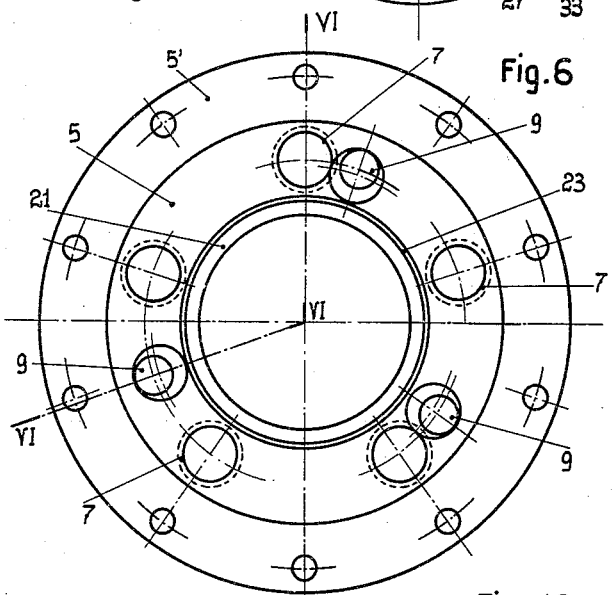
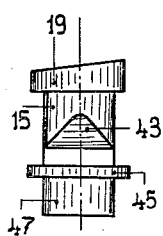
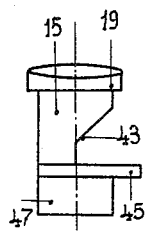
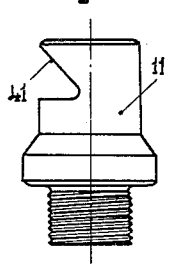
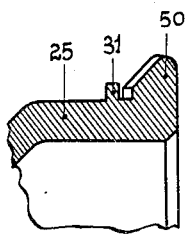

Patented Sept. 30, 1930

1,777,242

UNITED STATES PATENT OFFICE

REMO ZERBONE, OF TURIN, ITALY

DEVICE FOR FASTENING VEHICLE WHEELS

Application filed March 2, 1929. Serial No. 343,897.

This invention relates to a device for fastening in position vehicle wheels of any type, such as wheels with wire, wooden or metal spokes, or disc wheels, more particularly for use when a plurality of bolts are employed for connecting the wheel hub with its supporting surfaces.

This invention provides means by which the connecting bolts instead of being locked by the usual nuts are simultaneously held by means of a bayonet joint, comprising a rotatable member integral with the wheel hub, pressed by suitable springs and conveniently operable from the outside.

When this locking member is displaced in order to remove the wheel from the connecting bolts, it is engaged by suitable gripping means, by which it is permanently held, so that when it is desired to fit the wheel on again, this latter can be mounted unhindered on the bolts, the locking member being returned to its locking position after release of the gripping means and under the action of the abovementioned springs.

The gripping means may be released automatically as the wheel is pushed in position on its supporting sleeve or by operation from the outside.

Besides the gripping device means may be provided whereby, when the rotatable locking member is brought into the unlocked position, the wheel is partly detached and caused to slide on its supporting sleeve.

The acompanying drawing shows a constructional form of the object of this invention.

Figures 3 and 4 are an axial view partly in section and a front view of a detail, respectively;

Figure 5 shows another detail in plan view;

Figure 6 is a section taken along a broken line VI—VI—VI of Figure 5;

Figures 7 and 8 show a push rod in front and side view, respectively;

Figure 9 is a side view of one of the connecting bolts;

Figure 10 is a sectional view of a detail of a modified construction.

Figure 1:
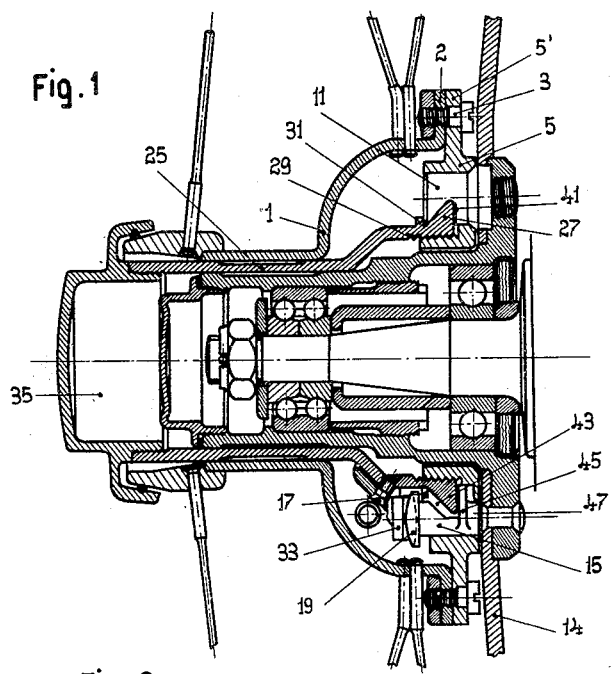
Figure 1 is a section on the wheel axis, the wheel being mounted on a sleeve of the usual type.

The object of this invention is shown on the drawing in connection with a wire spoke wheel of a well-known type.

The wheel hub 1 has an inner flange 2 to which a corresponding flange 5' integral with an annular member 5 shown in detail in Figures 5 and 6 is secured by means of screws 3. On the ring 5 are formed two rows of recesses 7 and 9 for lodging the bolts 11 carried by the flange supporting the brake drum 14 of the vehicle and loosely mounted push-rods 15, respectively, the action of which shall be explained hereinafter. The ring 5 is made hollow and is provided with a sleeve 21 screw-threaded on its outer edge at 23. A substantially cylindrical bush 25 is rotatably mounted coaxially with the wheel hub 1 and is enlarged at one end forming an edge 27 triangular in section, and is provided with an inner screw-thread 29 adapted to mesh with the screw-thread 23 in the ring 5. The outer rim of the bush 25 carries in proximity to its inner edge 27 an annular boss 31 having recess 17, spaced correspondingly to the recesses 9 on the ring 5, for lodging the peripheral parts of the heads 19 of the push-rods 15. To the bush 25 are fixed by screws three cams 33 each having an inclined surface and situated at a convenient angle to one another. The front end of the bush 25 is provided with an inner screw-thread for receiving a cap 35 of the known shape.

Two or more volute springs 37 are secured at one end to the ring 5 and at their other end to the bush 25, for holding this latter in a predetermined position.

In Figures 3 and 4 it will be seen that on the periphery of the edge 27 of the bush 25 are cut arcuated and equidistant slots 39, in the number of five in the example shown, which allow of the passage of the bolts 11 with a considerable play in certain conditions.

In the example shown in the heads of the bolts 11 (Figure 9) fixed to the flange for supporting the brake drum 14 are formed on one side with a sharp angle recess 41 conforming to the outer profile of the edge 27, with which they come into contact. The push rods 15 (Figures 7 and 8) are loosely mounted and have a head 19, ending above by a gradient corresponding to the shape of the cams 33 by which they are engaged, the rods being formed on one side with an angle shaped recess 43 engaging with a certain play the edge 27. The push-rods 15 are further provided with an abutment 45 and end in a cylindrical extension 47.

The device according to this invention works as follows:

Supposing the wheel to be mounted on the inner hub member of one of the axles of the car, when it is desired to detach the wheel, by acting on the cap 35, e. g. through a spanner of the known type, and rotating it together with the bush 25 through a certain angle (Figures 1 and 2) in a clockwise direction, the five bolts 11 will be unlocked and it will be possible to remove the wheel. The rotation of the cap together with the bush can be divided into two distinct steps; in the former (Figures 3 and 4) the conical edge 27 that in normal position holds the heads of the bolts 11 engaged by their recesses 41, causes its wide notches 39 to come into correspondence with the bolts 11 allowing these latter to withdraw. Meanwhile the cams 33 by virtue of the rotation of the bush have come into contact with the inclined heads 19 of the push-rods 15 loosely mounted in the ring 5 with a tendency to push them inwardly; by rotating the bush further (second step), the bolts 11 remaining free in the notches 39, the push-rods are caused to slide on their seats until their head portions 19 fall into the corresponding openings 17. By this process the extensions 47 of the push-rods 15 gradually leave the vertical outer plane of the ring 5 and are directed towards the adjacent disc 14, this being preferably the brake drum, causing a slight displacement of the wheel on the supporting sleeve. By this operation the detachment of the wheel is commenced and facilitated.

By the engagement of the heads of the push-rods 15 on the seat 17, the bush and ring unit is kept in the position in which it is possible to withdraw the wheel from the connecting bolts 11.

Figure 2:
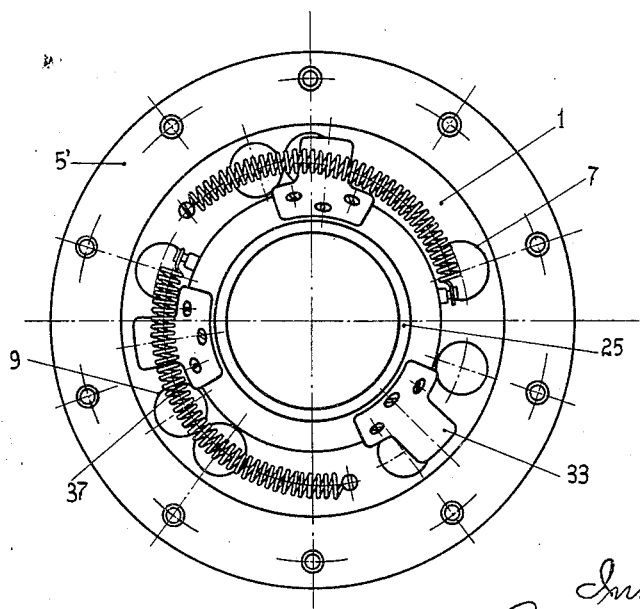
Figure 2 is a side view of a part of the members shown in Figure 1.

When it is desired to fit the wheel in the position shown in Figure 1, all that is necessary is to insert the bolts 11 in the openings 7 until the wheel comes into proximity to the brake drum 14 and the extensions 47 of the push-rods 15, by coming into contact with said drum, are pushed outwardly the whole length of their stroke.

As soon as the heads 19 of the push-rods have left the seats 17 on the bush 25, this latter under the action of the springs 37 is free to resume its normal position by clockwise rotation, with the result that the full portions of the edge 27 come into correspondence with the heads of the bolts 11 and lock these latter in position.

In the construction shown owing to the normal direction of the turns and to the pitch of the threads 23, 29 formed on the ring 5 and bush 25, respectively, when this latter is acted upon for detaching the wheel, the edge 27 is displaced inwardly, while when the bush 25 is rotated in the opposite direction for the purpose of fastening the wheel, the edge 27 is displaced outwardly so as to tighten the connection between the bolts 11 and the hub.

When the wheel is fitted in its proper position, the locking member common to all of the bolts, i. e. the bush 25 is reliably and automatically disengaged from its stops, namely the push-rods 15, and consequently returned by the action of the strong springs 37 to the predetermined locking position, thus considerably increasing the reliability in working.

According to a modified construction shown in Figure 10, instead of cutting a screw-thread on the ring 5 and bush 25 for screwing these two members together, I cut the edge 27, in the portions comprised between the notches 39, along helicoidal sectors 50 adapted to act upon rotation directly upon the recesses 41 of the bolts 11, that shall be cut to conform to the shape of the sectors 51, so as to loosen or tighten the connection of the wheel locking members when fastening or detaching the wheel.

What I claim is:

1. In a device for fastening vehicle wheels, a flanged inner hub member rotatably mounted on an axle, a wheel adapted to be fitted on said inner hub member, a circular concentric row of bolts on the flange of said member, a bayonet joint for clamping said wheel simultaneously to said bolts, means for moving said wheel axially outward when the bayonet is brought into the disengaged position and means for holding the bayonet joint in said disengaged position, said holding means being automatically released by moving the wheel inward to contact the flange of the inner hub member.

2. In a device for fastening vehicle wheels, a flanged inner hub member rotatably mounted on an axle, a wheel adapted to be fitted on said inner hub member, a bayonet joint member fixed to the flange of said inner hub member, a second bayonet joint member mounted on said wheel, springs bringing said second joint member into engaged position, means for moving said wheel axially outward, when the second joint member is brought into the disengaged position against the action of said springs, and means for holding the second joint member in said disengaged position, said holding means being automatically released by moving the wheel inward to contact the flange of the inner hub member.

3. In a device for fastening vehicle wheels, a flanged inner hub member rotatably mounted on an axle, a wheel hub adapted to be fitted on said inner hub member, a circular concentric row of bolts fixed to the flange of said inner hub member, each having a radical recess, a ring secured to the inner hub end and provided with holes engaging the bolts, a screw-threaded flange fast with said ring, a bush screwed on the flange of said ring and extending outwardly between the inner hub member and the wheel hub, the inner end of said bush being provided with spaced teeth corresponding in section with the recesses and adapted to engage therewith when the bush is rotated in one direction, the bush carrying at its other end a wheel holding cap and means mounted on said ring and co-operating with said bush for pushing the wheel outwardly when the bush is rotated in the other direction for disengaging said teeth from said recesses.

4. In a device for fastening vehicle wheels, a flanged inner hub member rotatably mounted on an axle, a wheel adapted to be fitted on said inner hub member, a bayonet joint member secured to the flange of said inner hub member, a second bayonet joint member rotatably mounted on the wheel hub and co-operating with the former for clamping the wheel to the inner hub member, a plurality of push-rods slidably mounted in holes on the second bayonet joint member and having cam-shaped surfaces, said push-rods resting against the flange of said inner hub member, cams carried by said second bayonet joint member and cooperating with said cam surfaces for pushing the wheel outwardly, when said second joint member is rotated for disconnecting the bayonet joint.

5. In a device for fastening vehicle wheels, a flanged inner hub member rotatably mounted on an axle, a wheel hub adapted to be fitted on said inner hub member, a circular concentric row of bolts fixed to the flange of said inner hub member and each having a radial wedge-shaped recess, a ring fixed to the inner hub end and provided with holes engaging the bolts, an annular flange fast with said ring, a bush screwed on said flange and extending outwardly between the inner hub member and the wheel hub, the inner end of said bush being provided with spaced teeth corresponding in cross section with the recesses on said bolts and adapted to engage therewith, when the bush is rotated in one direction, the bush carrying at its other end a wheel holding and operating cap; a plurality of push rods slidably mounted in holes on said ring and having cam-shaped surfaces, said push-rods resting against the flange on the inner hub member, cams carried by the bush and co-operating with said cam surfaces for pushing the wheel outwardly, when the bush is rotated in one direction for disengaging the teeth on said bush from the recesses on said bolts.

6. In a device for fastening vehicle wheels, a flanged inner hub member rotatably mounted on an axle, a wheel having a hub adapted to be fitted on said inner hub member, a bayonet joint member secured to the flange of said inner hub member, a second bayonet joint member rotatably mounted in the wheel hub and cooperating with the former for clamping the wheel to the inner hub member, resilient means tending to bring the second bayonet joint member in engagement with the first member, headed push rods slidably mounted in holes on the wheel hub, each having a head with a cam-shaped surface, said push-rods resting against said flange, cams carried by said second bayonet joint member and cooperating with said cam surfaces for pushing the wheel outwardly and at the same time engaging the heads of the push-rods in recesses on the second bayonet joint member for holding said second member in the disengaged position against the action of said resilient means.

7. In a device for fastening vehicle wheels, a flanged inner hub member rotatably mounted on an axle, a wheel having a hub adapted to be fitted on said inner hub member, a circular concentrical row of bolts secured to the flange of said inner hub member, each having a radial recess, a ring fixed to the inner end of the wheel hub and provided with holes engaging said bolts, an annular screw-threaded flange fast with said ring, a bush screwed on said screw-threaded flange and extending between the inner hub member and the wheel hub, the outer end of said bush being provided with a wheel holding cap and the inner end carrying spaced teeth corresponding in cross section with the recesses on the bolts and adapted to engage therewith, resilient means between the ring and said bush tending to bring said teeth into engagement with the recesses on said bolts, a plurality of push-rods slidably mounted in holes on said ring and each having a head with a cam-shaped surface, said push-rods resting against the flange of the inner hub member, cams carried by the bush and cooperating with said cam surface for pushing the wheel outwardly and bringing at the same time the heads of the push-rods into engagement with recesses on said bush for holding said bush in the disengaged position against the action of said spring means.

In testimony that I claim the foregoing as my invention, I have signed my name.

REMO ZERBONE.